United States Patent [19]

Takegami et al.

[11] 4,081,401
[45] Mar. 28, 1978

[54] PROCESS FOR PRODUCING ADSORBENT

[75] Inventors: Shinsuke Takegami; Takashi Korenaga; Chiharu Yoshinaga, all of Okayama, Japan

[73] Assignee: Japan Exlan Company Limited, Osaka, Japan

[21] Appl. No.: 736,527

[22] Filed: Oct. 28, 1976

[30] Foreign Application Priority Data

Nov. 17, 1975 Japan ............................ 50-138312

[51] Int. Cl.$^2$ .................... B01J 31/02; C02B 1/14; B01D 15/00; C04B 31/40
[52] U.S. Cl. ................................ 252/428; 252/426; 210/40; 210/192; 106/308 Q; 106/288 B
[58] Field of Search .................. 252/426, 428, 429 R; 210/40, 192; 106/308 Q, 288 B

[56] References Cited

U.S. PATENT DOCUMENTS

| 2,291,226 | 7/1942 | Higgins | 252/426 |
| 3,998,756 | 12/1976 | Sutherland | 252/422 |

Primary Examiner—Patrick P. Garvin
Assistant Examiner—William G. Wright
Attorney, Agent, or Firm—Wenderoth, Lind & Ponack

[57] ABSTRACT

The present invention relates to a process for producing an adsorbent for the treatment of waste water, suitable for column packing, which is composed of a granular material obtained by subjecting an aqueous mixture of an activated sludge-containing material and the water-soluble primary condensate of a formaldehyde-type resin and/or an aldehyde compound to a curing treatment with an acid catalyst and a granulating operation. The adsorbent can advantageously be used in disposing of industrial waste water containing ionic or nonionic water pollutants such as heavy metal ions, dyes, surfactants, high molecular weight coagulants and mineral oils.

6 Claims, No Drawings

PROCESS FOR PRODUCING ADSORBENT

BACKGROUND OF THE INVENTION

1. Field of the Invention

The present invention relates to a process for producing an adsorbent, and more particularly to a process for producing an adsorbent for the treatment of waste water, suitable for column packing, which is composed of a granular material obtained by subjecting a particular mixture mainly containing activated sludge to a curing treatment with an acid catalyst and a granulating operation, and which can advantageously be used in disposing of industrial waste water containing ionic or nonionic water pollutants such as heavy metal ions, dyes, surfactants, high molecular weight coagulants and mineral oils.

2. Description of the Prior Art

The waste water disposal system which treats organic waste water such as civil sewage, human waste, industrial waste water, etc. with activated sludge to reduce the BOD (biochemical oxygen demand) and the COD (chemical oxygen demand) of the waste water, is one of the waste water purification techniques generally practiced. In this treatment system, a large amount of excess activated sludge is accumulated with the passage of time, so that the disposal of the excess activated sludge is a great problem. Several attempts to utilize such excess activated sludge are being made: The use as slow-acting organic fertilizer or soil improver because of its richness in the three important elements of fertilizer, i.e. nitrogen, phosphorus and potassium; the use as feed for animals because it is composed mainly of proteins and hydrocarbons; and the use for removing ionic substances in the industrial water, utilizing its ampho-ionic properties.

In any of the above-mentioned uses, there is extreme difficulty in handling the activated sludge when it is used after it is removed from the treatment process, and particularly, when industrial waste water is subjected to a column treatment which uses activated sludge, it is necessary to granulate the activated sludge. However, activated sludge formed into granules after dehydration and drying has a fatal drawback that the granules are liable to fracture in water, in addition to their having a small mechanical strength (compressive strength, etc.), so that it has been utterly impossible to use such granules for column packing.

STATEMENT OF THE INVENTION

In view of such a situation, we conducted intensive research to prepare activated sludge granules which can be advantageously used for column packing. As a result, it has been found that granules containing activated sludge, produced by uniformly mixing specific amounts of the water-soluble primary condensate of a formaldehyde-type resin and/or an aldehyde compound, and optionally a water-soluble polymer, with an activated sludge-containing material, and subjecting the mixture to a particular acid curing treatment and a granulating operation, have excellent chemical and physical adsorbing power, high mechanical strength and excellent resistance to fracture in water. The present invention is based on this discovery.

The main object of the present invention is, therefore, to provide a process for producing an adsorbent for the treatment of waste water, which is very easy to handle and is very suitable for column packing.

Another object of the present invention is to provide a process for producing an adsorbent for column packing which can advantageously be used in disposing of industrial waste water containing heavy metal ions, dyes, surfactants and mineral oils, and which is inexpensive and can be used in an industrial manner.

Other objects of the invention will become apparent from the following detailed explanation of the invention.

These objects of the invention are attained by a process which comprises adding an acid to an aqueous mixture containing 100 weight parts, based on the dry matter, of an activated sludge-containing material and at least 5 weight parts of the water-soluble primary condensate of a formaldehyde-type resin and/or an aldehyde compound, to adjust the pH to a value below 5 so that the mixture is cured, and then subjecting the mixture to a granulating operation during or after the curing. The objects and effects of the present invention can be more effectively attained by uniformly compounding with the mixture, at least 0.5 weight part, for 100 weight parts of the above-mentioned activated sludge-containing material, of a water-soluble polymer.

The granular adsorbent produced according to the present invention combines a very high chemical adsorbing power, resulting from the ampho-ionic properties of the activated sludge, and an excellent physical adsorbing power derived from its inner structure, so that it is very advantageously used in the disposal of industrial waste water containing ionic or nonionic water pollutants such as heavy metal ions, dyes, surfactants, high molecular weight coagulants and mineral oils, for example fuel oil. In the acid curing treatment of the process of producing the granules, the primary condensate of formaldehyde-type resin and/or the aldehyde compound polycondensate to play a role as a binder for adhering the activated sludge to itself. Therefore, the granules have excellent mechanical strength (resistance to abrasion, compressive strength, etc.) and are not liable to fracture in water because of their water resistance, so that the granules are very suitable as an adsorbent for the column treatment of industrial waste water.

Considering that the present invention enables the effective utilization of excess activated sludge, which itself is an industrial waste, and that the adsorbent having excellent abilities can be inexpensively produced from such sludge, the present invention has an extremely high industrial and social importance.

DESCRIPTION OF PREFERRED EMBODIMENT

The activated sludge-containing material as referred to in the present invention is a generic term for the activated sludge formed by the product treatment of organic waste material such as civil sewage, industrial waste water, etc. (including activated sludge returned into the process cycle), especially excess activated sludge slurry (a wet muddy material), its dried matter and the solid substance obtained by subjecting the sludge slurry to operations such as coagulation, filtration, drying, etc. It is particularly preferable for the attainment of the objects and effects of the present invention to use the activated sludge formed by the activated sludge treatment of industrial waste water discharged from acrylic fiber production plants.

The primary condensate of a formaldehyde-type resin used in the present invention is a water-soluble primary condensate which is obtained by reacting formaldehyde with a phenolic compound such as phenol, cresol, and resorcin; and/or an amino compound such as urea, melamine, and aniline, and which can be condensed and cured by an acid catalyst. For the purpose of convenience, the primary condensate of a formaldehyde-type resin is abbreviated hereinafter as the water-soluble primary condensate.

The aldehyde compounds used in the present invention are those containing one or two aldehyde groups in one molecule, and include, for example, monoaldehydes such as formaldehyde, and dialehydes such as glyoxal, malondialdehyde, succindialdehyde and phthalaldehyde.

The water-soluble primary condensate and the aldehyde compound can be used alone or as an aqueous solution, but in order to obtain a more uniform mixture, it is preferable to use them as an aqueous solution.

Such an activated sludge-containing material is mixed uniformly in the usual way with the water-soluble primary condensate and/or the aldehyde compound. As regards the mixing ratio, it is necessary to mix uniformly at least 5 weight parts, preferably 10-100 weight parts, of the primary condensate and/or the aldehyde compound with 100 parts, based on the dry matter, of the activated sludge-containing material. Where the mixing ratio of the primary condensate and/or the aldehyde compound is less than 5 weight parts, it is difficult to elevate the mechanical strength (especially the compressive strength) of the adsorbent granules. When the activated sludge-containing material is in a wet state, it is necessary to suitably determine the mixing ratio of the primary condensate and/or the aldehyde compound so as to satisfy the above-mentioned condition by calculating the weight of the wet activated sludge-containing material on the basis of its dry matter weight.

In order to produce an adsorbent having a more excellent adsorbing power, it is important to add uniformly a water-soluble polymer to the mixture of the activated sludge-containing material and the water-soluble primary condensate and/or the aldehyde compound, in an amount of at least 0.5 weight part, preferably 5 to 30 weight parts, for 100 weight parts of said activated sludge-containing material. Where the mixing ratio is less than 0.5 weight part, it is difficult to effectively attain porosity of the inner structure of the adsorbent granules, due to the elution of the water-soluble polymer, so that such a mixing ratio is not desirable. The water-soluble polymers used in the present invention are not particularly limited, and for example there may be mentioned water-soluble polymers such as polyvinyl alcohol, polyacrylic acid, polyvinylpyrrolidone, polyacrylamide, polyethylene glycol, polystyrenesulfonic acid, polyvinyl acetate, carboxymethyl cellulose, starch, alginic acid, pectinic acid, humic acid and agar-agar.

The mixture of the activated sludge-containing material with the water-soluble primary condensate and/or the aldehyde compound, or the compounded product of said mixture to which a water-soluble polymer has been added, is then subjected to a curing treatment by adding an acid so as to adjust the pH to a value below 5. In this curing treatment, where the pH exceeds 5, the water-soluble primary condensate and/or the aldehyde compound can not sufficiently polymerize and cure, and therefore it becomes difficult to give a sufficient strength to the finally obtained granules. The acid curing reaction needs no heating, and treatment at ordinary temperature for several hours is sufficient. During this treatment, excess water in the mixture or the compounded product is removed to adjust the water content to about 40–80 weight percent, which is suitable for the later-mentioned granulating operation. The acids used in the curing treatment of the present invention may be any usual acid, and include, for example, inorganic acids such as hydrochloric acid, sulfuric acid, nitric acid, etc.; and organic acids such as acetic acid, para-toluenesulfonic acid, etc. They may be used either alone or in the form of an aqueous solution, so long as they can adjust the pH to a value below 5.

The granulating operation according to the present invention may be carried out during the acid curing treatment, so long as a water content suitable for the granulating operation can be obtained, or after the acid curing treatment, after which the water content in the mixture or the compounded product is maintained at about 40–80%. In either case, the granulating operation is performed by means of a known granulating apparatus or machine. Depending on the intended objects, the mixture or the compounded product is formed into various shapes of granules.

The granules thus obtained containing the activated sludge can pass through a sieve having a 12–32 mesh. They have a uniform granule shape and are excellent in mechanical strength, so that they are suitable as an adsorbent for the column treatment of industrial waste water.

In the actual practice of the treatment of industrial waste water by using the adsorbent obtained by the present invention, it is desirable to suitable adjust the pH of the waste water in accordance with the kind of the water pollutants (substances to be adsorbed) present in the waste water. For example, when the water pollutants are cationic substances such as heavy metal ions, cationic dyes, and cationic surfactants, the pH of the waste water should be adjusted to a value above the isoelectric point (the pH value at which the positive and negative dissociation constants in the activated sludge having ampho-ionic properties become equal; usually existing in the pH range of 4 to 6); when the pollutants are anionic substances such as anionic dyes, and anionic high molecular weight coagulants, the pH should be adjusted to a value below the isoelectric point; and when the pollutants are nonionic substances such as mineral oils, for example fuel oil, the pH should be subjected to a value in the vicinity of the isoelectric point. By such adjustment of the pH of the waste water, it becomes possible to display the adsorbing power of the adsorbent more effectively.

By following the present invention, it becomes possible to advantageously obtain an adsorbent having a high industrial utility value and having an excellent adsorbing power from excess activated sludge which has heretofore been of no utility value. Therefore, the industrial and social importance of the present invention should be valued very highly.

The following examples are described for a better understanding of the present invention and are not intended for limiting the scope of the invention. All parts and percentages in the examples are by weight unless otherwise specified.

The evaluation of the adsorbing power for heavy metal ions in the following examples was made by the following simple method: A 100 ml aqueous solution (pH 6–7) containing 10 p.p.m. of heavy metal ions was prepared for various kinds of heavy metal ions, respectively. Then 100 mg of the adsorbent was put into the aqueous solution, and after stirring the solution for one hour, the adsorbent was filtered off and the concentration of the heavy metal ions remaining in the filtrate was determined by atomic adsorption spectrometry (in the case of Hg ions), polarography (in the case of Pb and Cd ions) or spectrophotometry (in the case of Co ions).

EXAMPLE 1

1.64 parts of the water-soluble primary condensate of melamine resin (Sumirates Resin 607, produced by Sumitomo Chemical Co.) was mixed uniformly with 200 parts of an excess activated sludge slurry (solid matter content: 8.2%) formed by the activated sludge treatment of industrial waste water from an acrylic fiber production plant. After an aqueous hydrochloric acid solution was added to the thus-obtained aqueous mixture to adjust the pH to 2.5, the mixture was acid-cured by allowing it to stand at room temperature for several hours until its water content reached 50%. The mixture was then supplied to an extruder (Fuji Powdal Co.) to form fine noodles having a diameter of 1 mm. The fine noodles were supplied to a granulating machine (Fuji Powdal Co.) to produce activated sludge-containing granules which can pass through a 12–32 mesh filter. The granules thus obtained were resistant to water, so that they did not collapse when immersed in water. Also, they had an excellent mechanical strength. The adsorbing power of the granules for heavy metal ions was evaluated. The results shown in Table 1 were obtained for various heavy metal ions.

For comparison, Table 1 shows the results when using as the adsorbent a mixture of a sandy substance and sludge granules produced from excess sludge by merely dehydrating, drying and granulating the mixture, the mixing ratio of the sludge granules being 7%.

Table 1

|  | Ration (%) of heavy metal ions caught by each adsorbent | | | |
|---|---|---|---|---|
|  | Pb | Cd | Co | Hg |
| Present invention | 98.0 | 97.8 | 90.2 | 99.1 |
| Comparative example | 35.0 | 32.0 | 25.5 | 27.8 |

From the results shown in Table 1, it is apparent that the granules produced according to the present invention display the excellent adsorbing effect derived from their excellent chemical and physical adsorbing power.

Columns each packed with the same amount of the granules or sandy substance containing the above-mentioned activated sludge were prepared. Each of the above-mentioned various heavy metal ion solutions in an amount of 20 times the amount of the adsorbent packed into the column was passed through each column in one hour (S.V. = 20), and thereafter the ratio of the heavy metal ions adsorbed by each adsorbent was examined. The results were nearly equal to those shown in Table 1, so that it was confirmed that the adsorbent produced according to the present invention can be used advantageously for column packing.

EXAMPLE 2

4.1 parts of a 40% aqueous solution of glyoxal was mixed uniformly with 200 parts of an excess activated sludge slurry similar to that used in Example 1 (solid matter content 8.2%), and the mixture was subjected to the same operation as in Example 1 to obtain a granular substance. The thus-obtained granules were resistant to fracture with water and had excellent mechanical strength. The adsorbing power for heavy metal ions by the granules was evaluated for Cd ions. The concentration of Cd ions remaining in the filtrate was found to be 0.38 p.p.m. (adsorbing ratio 96.2%), which showed a satisfactory adsorbing effect.

EXAMPLE 3

8.0 parts of a 30% aqueous formaldehyde solution (formalin) was uniformly mixed with 200 parts of an excess activated sludge slurry (solid matter content 10.0%) formed by the same treatment as in Example 1. The mixture was subjected to the same operation as in Example 1 to obtain granules. The granules thus obtained had a high mechanical strength and were resistant to fracture with water. The adsorbing ratio for Cd ions was 90.6%, showing a satisfactory value.

EXAMPLE 4

2.0 parts of a 40% aqueous glyoxal solution and 0.1 part of carboxymethyl cellulose were uniformly mixed with 100 parts of a solid substance (solid matter content 8.2%) obtained by adding a high molecular weight coagulant to an excess activated sludge slurry formed by the same treatment as in Example 1, filtering the coagulated slurry and drying it. An aqueous hydrochloric acid solution was added to the mixture thus obtained to adjust the pH to 3.0. Thereafter, the mixture was allowed to stand at room temperature for several hours for acid curing reaction. The water content in the mixture after the curing reaction was 60%. This mixture was formed into granules by the same operation as in Example 1. The granules thus obtained exhibited a very high porosity and had a satisfactory mechanical strength. Adsorption tests for heavy metal ions were carried out using the granules. As shown in Table 2, it was confirmed that the granules produced according to the present invention can exhibit an excellent adsorbing effect.

Table 2

| Adsorption ratio for heavy metal ions (%) | | |
|---|---|---|
| Pb | Cd | Co |
| 97.9 | 97.7 | 95.6 |

The above-mentioned granules were packed into columns so that each column was filled to 50 volume %. 1000 volume % of a solution of each kind of the above-mentioned heavy metal ions was passed through each column in one hour (S.V. = 20). Thereafter, the concentration of the heavy metal ions remaining in the filtrate was measured. The results were nearly equal to those in Table 2.

EXAMPLE 5

One part of the water-soluble primary condensate of phenol-formalin resin (Riken P-302, produced by Showa Kobunshi Co.) and 2.5 parts of a 40% aqueous solution were mixed uniformly with 200 parts of an excess activated sludge slurry (solid matter content 10.0%) formed by the activated sludge treatment of a civil sewage. By the same operation as in Example 1, the final product (adsorbent) was prepared. The granules thus obtained had a high mechanical strength and were resistant to fracture by water. 100 mg of the granules were put into 100 ml of an aqueous solution, adjusted to pH 3, containing an anionic dye (dye concentration 10 mg/l), and the solution was stirred for one hour to keep the granules in contact with the solution. The granules were then filtered off. It was confirmed that no substantial dye remained in the filtrate. Similar adsorption tests were performed for an anionic high molecular weight coagulant and an anionic surfactant. In both cases, it was confirmed that no anionic substance remained in the filtrate.

What we claim is:

1. A process for producing an adsorbent, which comprises adding an acid selected from the group consisting of hydrochloric acid, sulfuric acid, nitric acid, acetic acid and para-toluenesulfonic acid to an aqueous mixture containing
    1. 100 weight parts, calculated on a dry weight basis, of an activated sludge-containing material formed by subjecting organic waste water to an activated sludge treatment, and
    2. at least 5 weight parts of a water-soluble primary condensate of a formaldehyde resin and/or an aldehyde compound selected from the group consisting of a monoaldehyde, glyoxal, malondialdehyde, succindialdehyde and phthalaldehyde, to adjust the pH of the aqueous mixture to a value below 5, so that the mixture may be permitted to cure, and subjecting the mixture to a granulating operation during or after the curing.

2. The process as claimed in claim 1 wherein the organic waste water is industrial water discharged from an acrylic fiber production plant.

3. The process as claimed in claim 1 wherein the mixing ratio of the primary condensate of a formaldehyde resin and/or the aldehyde compound is 10 to 100 weight parts per 100 weight parts of the activated sludge-containing material.

4. The process as claimed in claim 1 wherein said aqueous mixture further contains at least 0.5 weight part, per 100 parts of the activated sludge-containing material, of a water-soluble polymer selected from the group consisting of polyvinyl alcohol, polyacrylic acid, polyvinylpyrrolidone, polyacrylamide, polyethylene glycol, polystyrenesulfonic acid, polyvinyl acetate, carboxymethyl cellulose, starch, alginic acid, pectinic acid, humic acid and agar-agar uniformly mixed with the activated sludge-containing material.

5. The process as claimed in claim 4 wherein the mixing ratio of the water-soluble polymer is 5 to 30 weight parts per 100 weight parts of the activated sludge-containing material.

6. The process as claimed in claim 1 wherein, prior to the granulating operation, the water content of the mixture to be granulated is adjusted to 40 to 80%.

* * * * *